Figure 1:
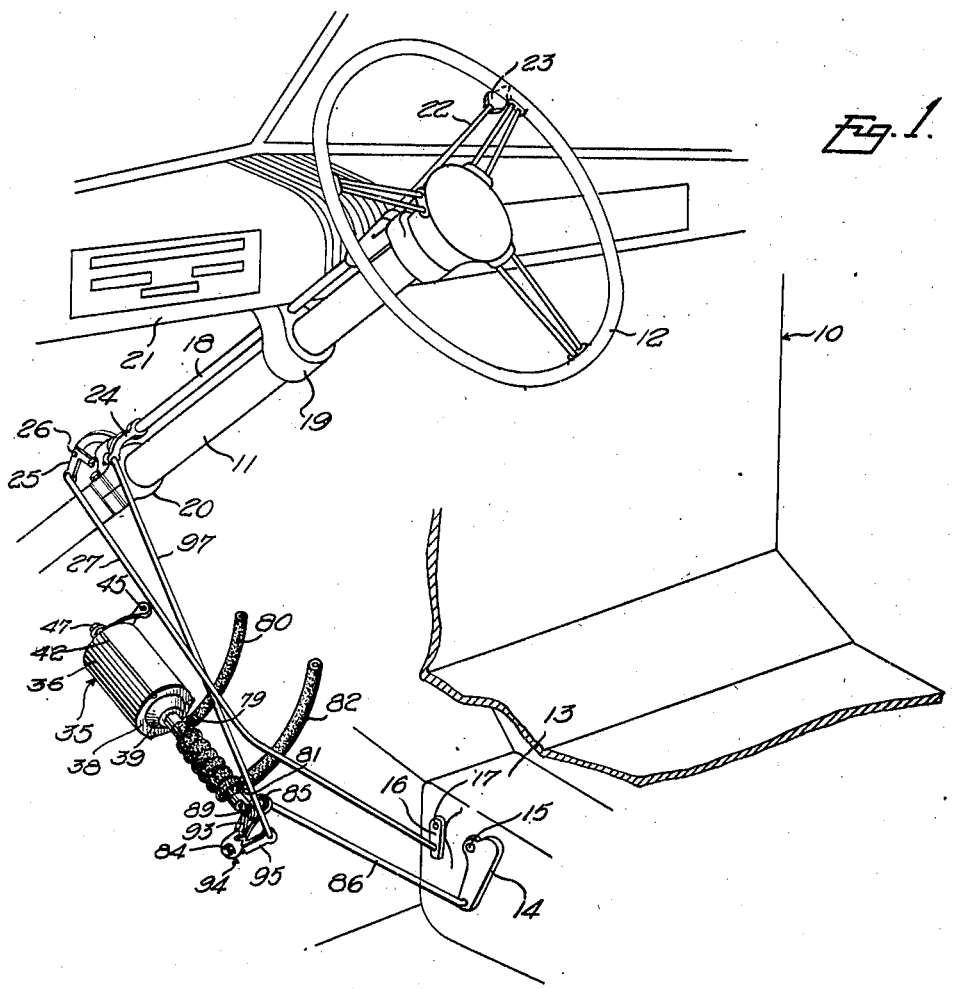

Jan. 18, 1944.  H. W. HEY  2,339,697
GEAR SHIFTING MECHANISM
Filed Feb. 27, 1940  2 Sheets-Sheet 1

Inventor
HENRY W. HEY
By
Attorney

Jan. 18, 1944.　　H. W. HEY　　2,339,697
GEAR SHIFTING MECHANISM
Filed Feb. 27, 1940　　2 Sheets-Sheet 2
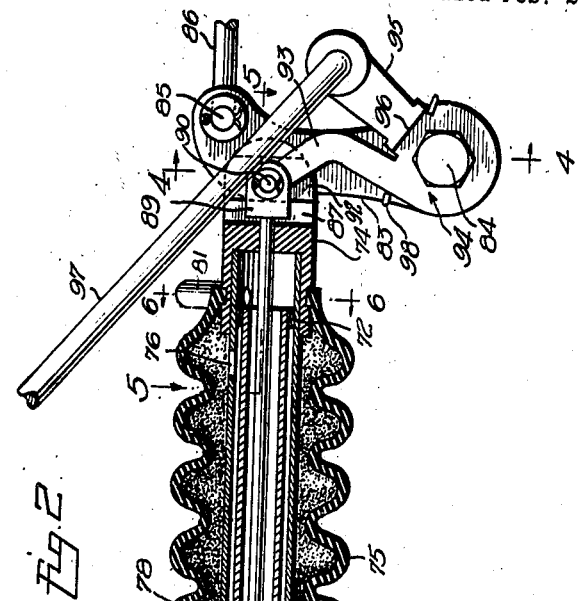
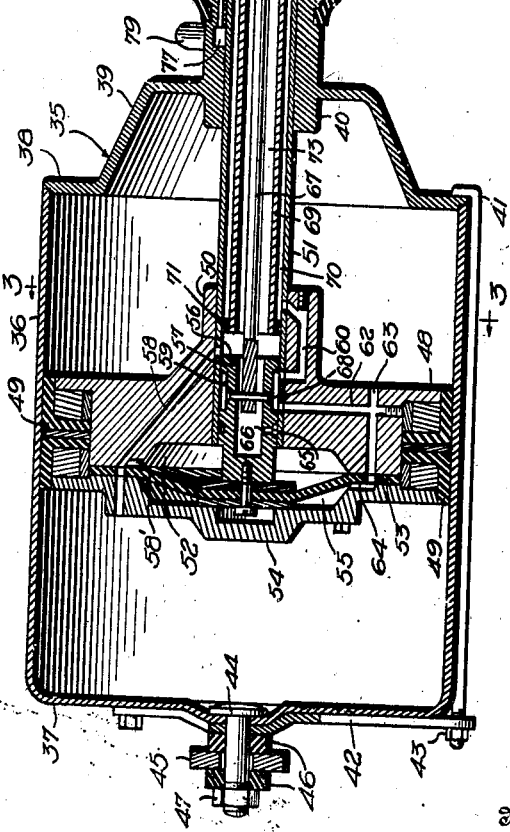
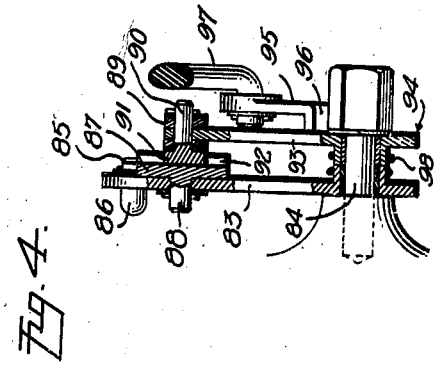
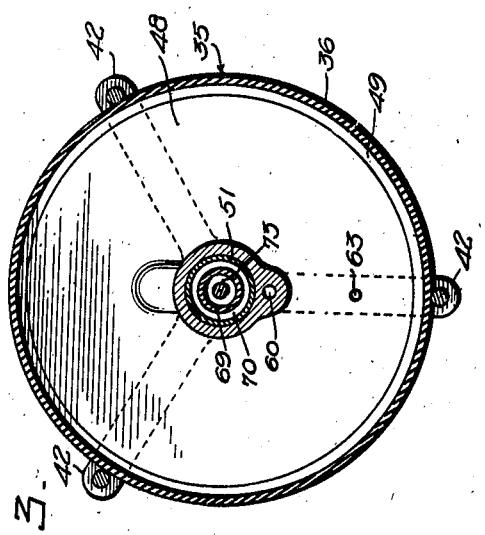
Inventor
HENRY W. HEY
By
C. L. Parker
Attorney Patented Jan. 18, 1944

2,339,697

UNITED STATES PATENT OFFICE 2,339,697

GEAR SHIFTING MECHANISM

Henry W. Hey, Richmond, Va., assignor to Automatic Shifters, Inc., Richmond, Va., a corporation of Virginia Application February 27, 1940, Serial No. 321,085

10 Claims. (Cl. 74—335)

This invention relates to gear shifting mechanisms, and more particularly to a fluid pressure operated gear shifting mechanism of the type shown in my copending application Serial No. 315,067, filed January 22, 1940.

In my copending application referred to I have provided a highly advantageous fluid pressure operated gear shifting motor and control mechanism therefor wherein the motor piston or other pressure movable member is directly connected by a rod to a crank arranged externally of the gear set to effect direct operation of such crank. Such a mechanism eliminates the prior common use of walking beams and other complicated lever mechanisms for delivering power from the shifting motor to the gear set and to provide the follow-up action of the valve mechanism which controls the motor. My prior mechanism referred to also is advantageous in that it embodies with the pressure movable member of the motor an auxiliary pressure responsive device connected to transmit to the manually operated control handle a resistance proportional to the resistance encountered in the shifting operation to provide the handle with the highly desired feature of accurate "feel".

The prior mechanism referred to has been found to be highly advantageous in any motor vehicle in which the apparatus can be mounted. In some motor vehicles, the arrangement of the vehicle engine, gear set, etc. with respect to other parts of the vehicle are such as to prevent the use of the mechanism of my copending application referred to for the reason that the apparatus cannot be installed in any position in which there is a direct linear space for mounting the motor and the piston rod whereby the latter can be directly connected to the shift lever of the gear set.

Accordingly an important object of the present invention is to provide a gear shifting mechanism which is generally similar to the device of the copending application referred to and wherein novel means is employed for accurately transmitting power from the piston of the shifting motor to the shift lever of the gear set and to provide for proper manual operation of the control valve mechanism for the shifting motor.

A further object is to provide a mechanism of this character wherein a novel compact lever mechanism is employed for transmitting power at an angle from the piston of the shifting motor to the gear set shift lever and to provide novel means forming a part of said lever mechanism for effecting direct manual shifting operation in the event of a failure of power in the shifting motor.

A further object is to provide a lever mechanism of the character referred to comprising a pair of simple compact levers one of which is manually operated to actuate the valve mechanism and the other of which is motor operated to effect the shifting operation, and wherein a novel lost motion connection is provided between the two levers which is inoperative during the normal operation of the apparatus but which provides a motion transmitting connection between the two levers in the event of a failure of power in the shifting motor to permit the operator to manually effect any shifting operation.

A further object is to provide novel means for effectively balancing the weight of the parts which are normally manually operated, to prevent the valve mechanism from creeping under the influence of the weight of the parts referred to, thus causing the motor piston to remain stationary at all times when the operation of the manual lever is stopped and the lever remains stationary.

Other objects and advantages of the invention will become apparent during the course of the following description.

Figure 5:
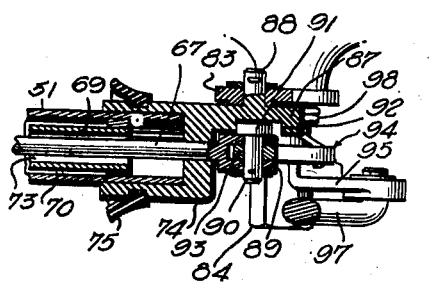
Figure 6:
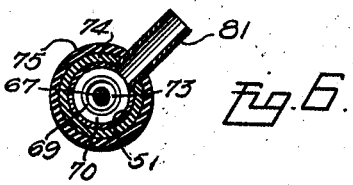

In the drawings I have shown one embodiment of the invention. In this showing:

Figure 1 is a fragmentary perspective view of a portion of a motor vehicle showing the invention applied, parts of the vehicle being broken away, Figure 2 is a central vertical longitudinal sectional view through the motor and associated elements, parts being shown in elevation, Figure 3 is a section taken on line 3—3 of Figure 2, Figure 4 is a similar view taken substantially on line 4—4 of Figure 2, Figure 5 is a similar view on line 5—5 of Figure 2, and, Figure 6 is a detail section on line 6—6 of Figure 2.

Referring to Figure 1 the numeral 10 designates the vehicles as a whole having the usual steering column 11 at the upper end of which is mounted the steering wheel 12. The vehicle is provided with the usual gear set indicated by the numeral 13 and provided with the usual transmission means and elements associated therewith (not shown) which are selectable and shiftable for providing the desired gear ratio. The transmission per se forms no part of the present invention and may be of any desired type, and is shown in the present instance as having a shiftable lever or crank arm 14 mounted on a shaft 15 and adapted to turn to shift the selected shiftable element. Selection of the desired shiftable element is effected by the turning of a smaller crank 16 mounted on a shaft 17.

The steering column is provided with means for controlling the selection and actuation of the shiftable elements of the transmission, and comprises a rod or tube 18 having its upper and lower end portions mounted for rocking movement in brackets 19 and 20, the upper of which may support the steering column with respect to the instrument panel 21. An operating lever handle 22 is connected to the upper end of the tube 18 in such a manner that rocking movement of the handle parallel to the steering wheel rocks the tube 18, while movement of the handle transversely of the plane of the steering wheel effects axial movement of the tube 18.

To facilitate its manual operation, the lever 22 may be provided with a finger engaging handle 23 which may be of any desired type. Inasmuch as the present apparatus is particularly adapted for finger tip operation, it is preferred that the handle or finger piece 23 be constructed in accordance with my prior Patent No. 2,161,778, granted June 6, 1939.

It will become apparent that the present invention is particularly adapted for use in connection with the mechanisms now provided on most motor vehicles for manually shifting the gears from a handle supported adjacent and beneath the steering wheel, and accordingly the tube 18 and lever 22 may form parts of such conventional manual shifting mechanism. To provide for the manual shifting of the gears in such a conventional mechanism, the tube 18 is provided with a crank 24 normally mechanically connected to the crank arm 14 by means to be referred to later. The crank arm 24 obviously is rocked upon rocking movement of the tube 18 and selection of the desired shiftable elements is effected by utilizing axial sliding movement of the tube 18 to turn a lever 25 pivotally supported intermediate its ends as at 26. This lever is connected by a rod 27 to the small crank arm 16 through which selection of the desired shiftable elements is effected. It will be noted that the rod 27 is shown as being bent intermediate its ends, such construction being necessary to avoid structural elements of the motor vehicle which prevent a direct straight line connection between the lever 25 and the crank arm 16. It is the same construction of the motor vehicle which prevents a direct straight line connection between the crank arm 24 and the shifting crank 14.

The shifting motor is shown in detail in Figure 2 of the drawings and is indicated as a whole by the numeral 35. The motor comprises a cylinder 36 preferably of drawn sheet steel including an integral head 37. The other end of the cylinder is closed by a head 38 preferably provided with a frustro-conical axial extension 39 carrying a bearing 40 to receive the piston rod to be referred to later. The head 38 is retained in position by hook bolts 41 extending through the arms of a spider 42 lying against the head 37 as shown in Figure 2, and nuts 43 tighten the hooks of the bolts 41 against the head 38.

A bolt 44 extends axially through the head 37 and through the center of the spider 42. A supporting bracket 45 for the motor has a portion receiving the bolt 44 and deformable washers 46 are arranged on opposite sides of such portion of the bracket 45 and are suitably clamped by a nut 47. The bracket 45 may be secured to any suitable stationary portion of the vehicle and is preferably secured to the crank case portion of the motor vehicle engine. It will be apparent that the deformable washers 46 permit the motor to partake of relative movement with respect to the bracket 45 for a purpose which will become apparent.

A piston 48 is reciprocable within the motor cylinder 36 and is provided with any suitable form of packing 49. The piston is provided with an axial extension 50 receiving the adjacent end of a tubular piston rod 51 which is secured in any suitable manner to the extension 50 and is slidable in the bearing 40. The piston has its face opposite the piston rod 51 recessed to provide a pressure chamber 52 over which is mounted a diaphragm 53, and a cap 54 is arranged over the diaphragm and secured to the adjacent face of the piston, the inner face of the cap 54 being recessed to provide a pressure chamber 55. The pressure chambers 52 and 55 communicate with the respective ends of the cylinder 36 whereby the diaphragm 53 is responsive to differential pressures in the motor for a purpose to be described.

A valve 56 is axially slidable in the inner end of the tubular piston rod 51. This valve is provided with an elongated axial recess 57 in constant communication with the interior of the piston rod 51. The space within the piston rod 51 adjacent the valve 56 is adapted to communicate with the interior of the left hand end of the cylinder through a port or passage 58 (Figure 2). The passage 58, as shown in Figure 2, extends through the diaphragm 53 and the cap 54, and the face of the piston 48 adjacent the diaphragm 53 is grooved as at 58' to connect the chamber 52 to the passage 58 whereby such chamber is always influenced by the pressure existing in the left hand end of the cylinder 36 as viewed in Figure 2. The valve 57 is provided intermediate its ends with an elongated circumferential groove 59 the forward end of which is adapted to communicate with the port 58 when the valve 56 is moved to the right of the position shown in Figure 2. The groove 59 is in constant communication with a passage 60 leading to the atmosphere in a manner to be described.

When the valve 56 is in the position shown in Figure 2 the groove 59 communicates with a passage 62 communicating with a horizontal passage 63 which communicates with the right hand end of the cylinder 36 as viewed in Figure 2. The cap 54 is grooved as at 64 to connect the passage 63 to the chamber 55 whereby the latter always is influenced by the pressure in the right hand end of the cylinder 36 as viewed in Figure 2. When the valve 56 is moved to the right of the position shown in Figure 2, the passage 62 is adapted to communicate with a peripheral groove 65 formed around the valve 56 and communicating with the axial recess 57 through a radial opening 66. Movement of the valve 56 is effected by a stem 67 extending into the recess 57 and connected to the valve by a pin 68.

A tube 69 is arranged within the tubular pivotal stem 51 coaxially therewith and spaced therefrom to provide an annular space 70. The ends of the tube 69 are provided with sealing rings 71 and 72, thus sealing the space 70 from the spaces within the tubular piston rod beyond the ends of the tube 69. The space 70 is connected to the atmosphere in a manner to be described. It will be noted that the tube 69 surrounds the valve operating stem 67 in spaced relation thereto to provide a space 73 which is in constant communication, in a manner to be described, with a source of partial vacuum such as the intake manifold of the motor vehicle engine.

A head 74 is recessed to receive the adjacent end of the tubular piston rod 51, these elements being secured together in any suitable manner. A collapsible rubber or similar boot 75 has one end surrounding the projecting end of the bearing 40 and its other end surrounding the head 74. The piston rod 51 is provided with an opening 76 communicating between the interior of the boot 75 and the space 70. It will be obvious that the boot serves the dual purpose of preventing dust from entering the bearing 40 and for preventing the entrance of dust with the air passing into the space 70 within the tubular piston rod. The bearing 40 is provided with an internal air space 77 communicating with the interior of the boot 75 through an opening 78. A nipple 79 is carried by the bearing 40 and communicates with the air space 77, and a flexible hose 80 is preferably connected between the nipple 79 and an air cleaner (not shown) for preventing the entrance of any dust into the interior of the boot 75.

A nipple 81 (Figures 2 and 6) projects through the head 74 and the adjacent end of the tubular piston rod 51 and this nipple is connected by a flexible hose 82 to the intake manifold of the motor vehicle (not shown) thus providing a source of nonatmospheric pressure through which differential pressures may be built up in opposite ends of the shifting motor.

Referring particularly to Figures 2, 3 and 4, the numeral 83 designates a lever having its lower end pivoted on a stud 84 carried by a portion of the motor vehicle power plant. As will be referred to later, the lever 83 replaces a bell crank lever employed on the motor vehicle for which the present invention is particularly intended, which bell crank lever forms the means for transmitting manual rocking movement of the tube 18 to the crank 14. The present device, upon being installed on the vehicle for which it is intended requires only the replacement of such bell crank lever. The lever 83 has pivotal connection as at 85 with one end of a rod 86 and the other end of this rod is connected to the shift crank 14.

The head 74 is provided with a longitudinal extension 87 offset from and parallel to the axis of the cylindrical portion of the head. The extended portion 87 of the head is provided with a stud 88 extending through the lever 83 and pivotally connecting the head 74 thereto. It will be apparent that actuation of the piston 48 operates the lever 83 to rock the crank 14 and effect the desired shifting actions, the pivot 88 (Figure 4) being adapted to swing on an arc of a circle about the axis of the stud 84 by virtue of the deformable supporting washers 46 (Figure 2).

The valve operating rod 67 is provided at its outer end with a yoke 89 through which passes a stud 90 carried by a preferably rectangular head 91 mounted in a slot 92 formed in the extension 87 of the head 74. As shown in Figure 5, the head 91 is narrower than the slot 92, thus permitting the stud 90 and consequently the valve operating rod 67 to partake of limited movement independently of the head 74. The stud 90 pivotally connects the yoke 89 to one arm 93 of a bell crank lever 94, this lever being also pivotally mounted on the stud 84 as clearly shown in Figure 4. It will be apparent therefore that the lever 83 and bell crank lever 94 swing about the same axis. The bell crank lever 94 is provided with a second arm 95 offset outwardly as at 96 and connected to one end of a rod 97. This rod has its other end connected to the crank arm 24 as shown in Figure 1, and the offset 96 is provided so that the rod 97 will clear the bell crank lever and elements associated therewith as shown in Figure 4. A torsion spring 98 has its coiled portion surrounding the hubs of the levers 83 and 94 and its ends engaging one edge of the lever 83 and one edge of the lever arm 95 to tend slightly to turn these levers with respect to each other. The tension of the spring tends to turn the lever arm 95 relatively in a counterclockwise direction as viewed in Figure 2 and the purpose of the spring is to balance the weights of the lever arm 95, rod 97 and crank arm 24 (Figure 1) so as to eliminate any tendency for the weights of the parts referred to to tend to turn the bell crank lever 94 in a clockwise direction as viewed in Figure 2, which, in turn, would tend to move the valve 56 out of its neutral position.

The operation of the device is as follows:

As previously stated, the present apparatus is intended for installation on any particular motor vehicle wherein extreme difficulty has been encountered in mounting power shifting mechanisms of other types. This difficulty has been due to the fact that the arrangement and location of the parts on such motor vehicle is such that no space can be found for present types of shifting mechanisms involving the use of walking beams and other levers, and in order to mount such mechanisms in operative position at all, it has been necessary to use additional levers. This complicates the mechanisms, renders their manufacture more expensive, and materially increases the time required for installation, and consequently increases the expense of installation. The present apparatus is characterized by a total lack of levers for the shifting motor and the control mechanism therefor, except for the two simple levers 83 and 94, which levers facilitate rather than impede the installation.

In this connection it is pointed out that the particular motor vehicle for which the present installation is intended has its power plant and other elements of the vehicle so arranged as to render it impracticable in the manual shift which is standard equipment on such vehicle, to directly connect the crank arm 24 (Figure 1) to the shifting crank 14. Such motor vehicle therefore is provided with a bell crank lever supported on a stud for which the stud 84 is substituted, the rod 97 being connected to one arm of such bell crank lever and the rod 86 being connected to the other arm thereof.

In installing the present apparatus it is unnecessary to replace any other element of the entire manual shifting system except the bell crank lever referred to. The bell crank lever furnished with the manually operable shifting mechanism is removed by removing the stud which supports such lever, replacing the lever with the assembly comprising the levers 83 and 94, and then placing the stud 84 in position. The rods 86 and 97, which are a part of the manual shifting system, already present, obviously are disconnected from the bell crank lever which is replaced, and these rods are connected to the present lever assembly as shown in Figure 2. Thus it will be apparent that the rods 97 and 86 are retained with the present mechanism, thus eliminating the necessity for manufacturing substitute rods and eliminating the time required for their replacement.

For the purpose of illustration the tubular piston rod 51, the elements enclosed in such piston rod, and the boot 75 have been shown shorter than is true in actual practice. The shifting motor 35 actually is arranged somewhat forwardly of the position shown in Figure 1 and the supporting bracket 45 is secured preferably to one of the crank case bolts of the motor vehicle engine, thus eliminating the addition of any extra fastening or supporting means for the motor. As previously stated, therefore, the present apparatus can be installed in a very few minutes time merely by disconnecting the rods 86 and 97, removing the conventional bell crank lever, replacing such lever with the lever assembly shown in Figure 2, and then connecting the rods 86 and 97 to the proper points.

After being assembled in the manner referred to the apparatus is ready for operation. Assuming that the driver desires to shift from neutral position into low gear position, he will depress the conventional vehicle clutch, lift the handle 23 directly toward the steering gear 12 in the neutral position of the handle, and then move the handle downwardly and rearwardly parallel to the plane of the steering wheel. Lifting the handle 23 rocks the lever 25 and pulls the rod 27 to rock the crank arm 16 and thus select low or reverse gear for operation.

Upon downward movement of the handle 23 parallel to the steering wheel, the tube 18 and crank arm 24 will be rocked in a clockwise direction as viewed in Figure 1, thus pulling the rod 97 and rocking the bell crank lever 94 in a counterclockwise direction as viewed in Figure 2. This operation moves the valve 56 to the left of its neutral position as viewed in Figure 2 and the valve may assume the position shown in Figure 2. Under such conditions air will flow through the nipple 79 into the opening 77, through port 78 to the interior of the boot 75, through the opening 76 and the space between the tubular piston rod 51 and the tube 69. The air then flows into the passage 60, and it will be apparent that this passage and the valve groove 59 are always in communication with the atmosphere. With the valve in the position referred to air will flow through the passage 62 and thence through the passage 63 into the right hand end of the cylinder 36 as viewed in Figure 2, and air will also flow through the groove 64 into the diaphragm chamber 55.

The nipple 81 is in constant communication with a source of partial vacuum such as the intake manifold of the motor vehicle engine. The space between the valve 56 and the inner end of the tube 69 is always in communication with the nipple 81 through the space surrounding the valve operating rod 67. With the parts in the position referred to, the vacuum space adjacent the valve will be in communication through the passage 58 with the left hand end of the cylinder 36 as viewed in Figure 2, and with the diaphragm chamber 52 through the groove 58'.

Under such conditions it will be obvious that the piston 48 will move toward the left as viewed in Figure 2, such direction being the same as the direction of movement of the valve 56. The diaphragm chamber 55 will be in communication with the right hand end of the cylinder as viewed in Figure 2 while the diaphragm chamber 52 will be in communication with the left hand end of the cylinder, and accordingly the differential pressures affecting the diaphragm 53 will operate to resist movement of the valve 56 toward the left as viewed in Figure 2.

The pressures present in the chambers 52 and 55 will always be exactly the same as the pressures present respectively in the right and left ends of the cylinder 36 as viewed in Figure 2, and accordingly the resistance to the movement of the valve 56 in either direction from neutral position will always be proportionate to the pressure existing in the motor 56. These pressures, in turn, are always proportionate to the resistance encountered in the shifting operation, the parts moving with very low differential pressures existing in opposite ends of the cylinder 36 when the resistances to the shifting operation are slight and increasing as the shifting resistances increase, as fully explained in my copending application Serial No. 315,067, referred to above.

Assuming that the shift is being made into low gear position, the operator may stop movement of the handle 23 at any time, whereupon movement of the valve 56 will stop and a slight additional movement of the piston 48 will restore the relative neutral position of the valve 56 with respect to the passages communicating with opposite ends of the cylinder 36. It will be apparent that this arrangement provides a follow-up action of the valve 56 with respect to the piston 48, the latter always moving a distance proportional to the distance of movement of the handle 23.

With the "feel" and follow-up means referred to the operator may efficiently make the shift into low gear, which is the operation being considered, resistance to the shifting operation incident to overcoming the neutral detents of the transmission and in operating the synchronizing means of the transmission being felt by the operator through the handle 23, thus permitting him to hesitate at the proper points in the shifting operation as is true in conventional manual shifting. When the handle 23 reaches low gear position the shift into low gear will have been completed, and movement of the piston 48 will be arrested adjacent the left hand end of the cylinder 36, as viewed in Figure 2.

The operator may then release the clutch pedal and operate the accelerator to gain the desired momentum in second gear, whereupon he may release the accelerator pedal, depress the clutch pedal and make the shift into second gear. This is accomplished by moving the handle 23 upwardly and forwardly parallel to the plane of the steering wheel 12 until the neutral position is reached, then dropping the handle 23 directly away from the steering wheel to rock the lever 25 and transfer the shift to the second and high gear shiftable members of the transmission, whereupon the shift may be completed by again moving the handle 23 upwardly and forwardly parallel to the plane of the steering wheel. Upward and forward movement of the handle 23 parallel to the plane of the steering wheel reverses the operation of the crank 24, rod 97 and bell crank lever 94, the latter being turned in a clockwise direction as viewed in Figure 2 to move the valve 56 to the right of its neutral position as viewed in Figure 2.

When the valve assumes such position the atmospheric groove 59 of the valve will be disconnected from communication with the passage 62 and will be moved into communication with the passage 58, thus connecting the forward end of the cylinder 36, that is, the left hand end as viewed in Figure 2, with the atmosphere. At the same time, the groove 65 will be moved into communication with the passage 62 and this passage thus will communicate with the interior of the valve 56 which is open to the vacuum space between the valve and the adjacent end of the tube 69. Thus the rear or right hand end of the cylinder 36 will be connected to the source of partial vacuum and the piston 48 will move toward the right as viewed in Figure 2. As previously explained, the pressures in the diaphragm chambers 52 and 55 are always such as to oppose movement of the valve 56, which movement is always in the same direction as the movement of the piston 48. As this piston moves toward the right, therefore, the differential pressures affecting the diaphragm 53 will oppose movement of the valve 56 toward the right, the resistance thus offered to the valve again, as in every case, being proportional to the resistance encountered in the shifting operation.

When the handle 23 reaches neutral position and is dropped downwardly directly away from the steering wheel, movement of the handle 23 parallel to the plane of the steering wheel will be arrested and the piston 48 will stop at its central or neutral position. As soon as the crossover movement of the handle 23 has been completed and this handle is moved forwardly, however, the piston 48 will again move toward the right under the control of the operator due to the follow-up action referred to.

After the shift has been completed into second gear, the vehicle clutch is engaged in accordance with conventional practice and the accelerator pedal is depressed to provide the desired vehicle speed in second gear. The accelerator is then released and the vehicle clutch disengaged, whereupon the handle 23 may be pulled directly downwardly parallel to the plane of the steering wheel 12 throughout the range of movement of the handle 23, it being obvious that no cross-over is made in the neutral position. The operation of the valve mechanism for the shift into high gear will be exactly the same as for the operation when shifting into low gear, the valve being moved to the left of the neutral position shown in Figure 2 to cause the piston 48 to move to the left.

The shift into reverse obviously may be made when the handle 23 is in the neutral position by moving this handle directly toward the steering wheel and then upwardly and forwardly parallel to the plane of the steering wheel. The cross-over operation of the handle 23 will select the low and reverse gear side of the transmission for operation, and the valve mechanism and the motor 35 will operate the same as for the shift into second gear, the piston 48 moving toward the right as viewed in Figure 2.

Referring to Figures 3 and 5, it will be obvious that the head 74 of the piston rod has its extension 87 directly connected by the pivot pin 88 to the lever 83. Obviously movement of the piston rod of the shifting motor is thus transmitted directly to the lever 83 and movement of this lever pushes or pulls the rod 86 to directly operate the shifting crank 14 to provide the desired shifts. As previously stated the pivot pin 88 swings on an arc of a circle about the axis of the stud 84 (Figure 4) and accordingly the pivot pin has an appreciable vertical component of movement which is permitted by virtue of the cushioned mounting of the opposite end of the motor through the deformable washers 46. With the use of the lever 83 it will be apparent that the motor operates the lever 83 in exactly the same way that the rod 97 operates the lever for which the present lever mechanism is substituted.

The pivot pin head 91 (Figures 4 and 5) is confined within the slot 92 and this slot is of such width as to permit the free operation of the yoke 89 and valve operating rod 67 upon the manual operation of the bell crank lever 94 by the rod 97, so long as the apparatus is properly functioning. The head 91 and slot 92 provide a lost motion connection between the levers 83 and 94 and in the event of a failure of power in the shifting motor, the play between the head 91 and slot 92 may be taken up by the manual operation of the lever 94, whereupon movement of such lever will be directly transmitted to the lever 83 through the extension 87 on the head 74 and through the pivot pin 88. The levers 83 and 94 thus become, in effect, a single lever which functions in the same manner as the conventional bell crank lever for which the present lever mechanism has been substituted. Thus it will be apparent in the event of a failure of power in the shifting motor any shifting operation may be readily manually performed.

The spring 98 is provided to balance the weight of the parts through which manual movement is transmitted to the valve rod operating yoke 89. A slight loading of the spring 98 is all that is required to balance the movement of the parts, such as the crank arm 95 and rod 97, thus positively preventing the valve 56 from creeping to the right as viewed in Figure 2 under the influence of the weight of the parts referred to.

From the foregoing it will be apparent that the present apparatus is simple in construction and involves the use of a minimum number of parts externally of the motor, thus permitting the use of an exceedingly compact unit which may be so arranged as to render it easily installable in motor vehicles in which installation of present types of vacuum shifters is difficult if not impossible. The motor is supported preferably by one of the crank case bolts, thus eliminating the provision of any separate motor supporting bracket cast or otherwise secured to some conventional part of the motor vehicle. The present mechanism also permits the retention of all of the conventionally employed parts of the manual shifting mechanism with the single exception of the bell crank lever normally supported for turning movement about the axis of the stud 84, the simple lever mechanism 83 and 94 being substituted for such bell crank lever. Accordingly the mechanism obviously can be quickly installed by unskilled workmen.

In this connection it will be apparent that the elimination of the substantial number of levers commonly employed for installing vacuum shifting motors in the particular vehicle for which the present invention is intended substantially reduces the cost of the apparatus and the assembly of the parts thereof. Moreover, earlier and more complicated installations require a substantial length of time for installation by a skilled mechanic, and the installation costs of such a mechanism are substantial. By virtue of the simplicity of the operation, the cost of installation of the present mechanism is substantially negligible.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In combination with an operating element of a motor vehicle transmission movable in opposite directions from a neutral position into different transmission setting positions, a lever, a rod connecting said lever to said transmission operating element, a power device having a linearly movable member directly connected to said lever to effect movement thereof, a control mechanism for said power device having a control element movable co-linearly with said member of said power device, and a manually operable mechanism comprising a rod having mechanical connection with said control element at a point adjacent said lever, said control element having lost motion connection with said lever adjacent said point to transmit manual movement to said lever upon a failure of power in said power device.

2. In combination with an operating element of a motor vehicle transmission movable in opposite directions from a neutral position into different transmission setting positions, a lever, a rod connecting said lever to said transmission operating element, a power device having a linearly movable member directly connected to said lever to effect movement thereof, a control mechanism for said power device having a control element movable co-linearly with said member of said power device, and a manually operable mechanism comprising a rod having mechanical connection with said control element at a point adjacent said lever, said control mechanism being constructed and arranged to cause said power device to partake of a follow-up action with respect to said manually operable mechanism, said control element having lost motion connection with said lever adjacent said point to transmit manual movement to said lever upon a failure of power in said power device.

3. In combination with an operating element of a motor vehicle transmission movable in opposite directions from a neutral position into different transmission setting positions, a lever arm, means comprising a rod pivoted to said lever arm to transmit movement thereof to said transmission operating element, a differential fluid pressure motor having a pressure movable member substantially in alinement with said rod and connected to said lever arm to effect movement thereof, a control valve mechanism for said motor, and a manually operable mechanism comprising a rod having one end thereof connected to operate said valve mechanism, said manually operable mechanism adjacent said end of said last named rod having lost motion connection with said lever arm to transmit manual movement thereto upon a failure of power in said motor.

4. In combination with a transmission having an operating crank externally thereof movable in opposite directions from a neutral position into different transmission setting positions, a lever arm supported for turning movement at a point spaced from said crank, a rod connecting said lever arm to said crank, a power device directly connected to said lever arm to effect movement thereof, a control mechanism for said power device, and a manually operable mechanism comprising a lever mounted for turning movement adjacent said lever arm, and a rod connected to said lever to effect turning movement thereof, said manually operable mechanism having lost motion connection with said lever arm to transmit manual movement thereto upon a failure of power in said power device.

5. In combination with a transmission having an operating crank externally thereof movable in opposite directions from a neutral position into different transmission setting positions, a lever arm supported for turning movement at a point spaced from said crank, a rod connecting said lever arm to said crank, a power device directly connected to said lever arm to effect movement thereof, a control mechanism for said power device, and a manually operable mechanism comprising a lever mounted for turning movement adjacent said lever arm, and a rod connected to said lever to effect turning movement thereof, said control mechanism being constructed and arranged to cause said power device to partake of a follow-up action with respect to said manually operable mechanism, said manually operable mechanism having lost motion connection with said lever arm to transmit manual movement thereto upon a failure of power in said power device.

6. In combination with a motor vehicle transmission having an operating crank externally thereof movable in opposite directions from a neutral position into different transmission setting positions, a lever arm supported for turning movement at a point spaced from said crank, a rod pivoted at its ends to said lever arm and to said crank, a power device having a linearly movable member directly connected to said lever arm to effect movement thereof, a control mechanism for said power device having a control element movable co-linearly with said member of said power device, and a manually operable mechanism comprising a lever mounted for turning movement adjacent said lever arm and connected to said control element, said manually operable mechanism having lost motion connection with said lever arm to transmit manual movement thereto upon a failure of power in said power device.

7. In combination with a motor vehicle transmission having an operating crank externally thereof movable in opposite directions from a neutral position into different transmission setting positions, a lever supported for turning movement at a point spaced from said crank, a rod pivoted at its ends to said lever and to said crank, a power device having a power operated member linearly movable substantially in alinement with said rod and directly connected to said lever to effect movement thereof, a control mechanism for said power device having a control element movable co-linearly with said member of said power device, and a manually operable mechanism comprising a lever mounted for turning movement adjacent said first named lever and connected to said control element, said control mechanism being constructed and arranged to cause said power device to partake of a follow-up action with respect to said manually operable mechanism, said second named lever having lost motion connection with said first named lever to transmit manual movement to the latter upon a failure of power in said power device.

8. In combination with a motor vehicle transmission having an operating crank externally thereof movable in opposite directions from a neutral position into different transmission setting positions, a pair of levers supported for turning movement on a common axis, a rod connecting one of said levers to said crank, a power device having a member movable substantially in alinement with said rod and directly connected to such lever to effect movement thereof, a control mechanism for said power device connected to said other lever, and a manually operable mechanism comprising a rod connected to said other lever, said other lever having a projection carried thereby and cooperating with a portion of said first named lever to form a lost motion connection whereby said first named lever will be manually operated by said other lever upon a failure of power in said power device.

9. In combination with a motor vehicle transmission having an operating crank externally thereof movable in opposite directions from a neutral position into different transmission setting positions, a pair of levers supported for turning movement on a common axis, a rod pivotally connected at its ends to one of said levers and to said crank, a differential fluid pressure motor having a pressure responsive member movable substantially in alinement with said rod and connected to said first named lever to effect movement thereof, a control valve mechanism connected to the other lever, and a manually operable mechanism comprising a rod connected at one end to said other lever, said levers having lost motion connection with each other whereby said first named lever will be manually operated by said other lever upon a failure of power in said motor.

10. In combination with a motor vehicle transmission having an operating crank externally thereof movable in opposite directions from a neutral position into different transmission setting positions, a pair of levers supported for turning movement on a common axis, a rod pivotally connected at its ends to one of said levers and to said crank, a differential fluid pressure motor having a pressure responsive member movable substantially in alinement with said rod and connected to said first named lever to effect movement thereof, a control valve mechanism connected to the other lever, and a manually operable mechanism comprising a rod connected at one end to said other lever, said levers having lost motion connection with each other whereby said first named lever will be manually operated by said other lever upon a failure of power in said power device, said valve mechanism and the pressure movable member of said motor being constructed and arranged to cause said pressure movable member to partake of a follow-up action with respect to said manually operable mechanism.

HENRY W. HEY.